May 1, 1923.
C. M. C. BAIRD
1,453,823
HOSE CONSTRUCTION
Filed March 24, 1919
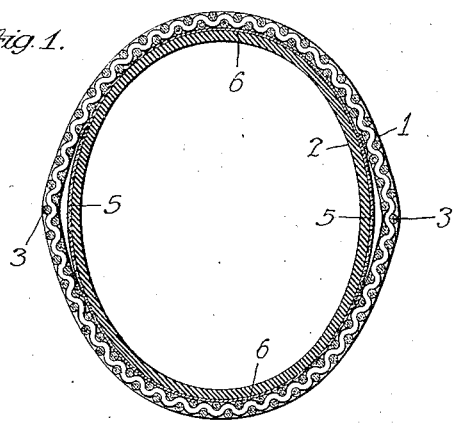
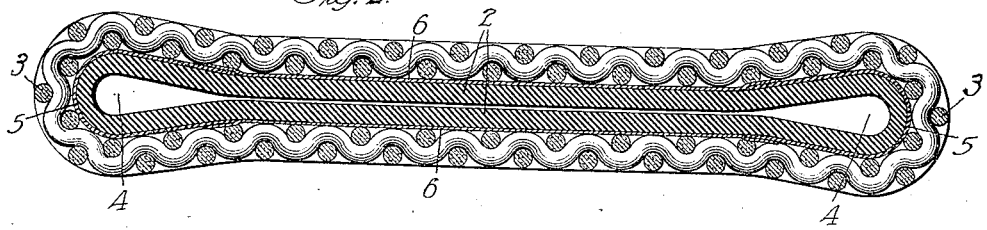
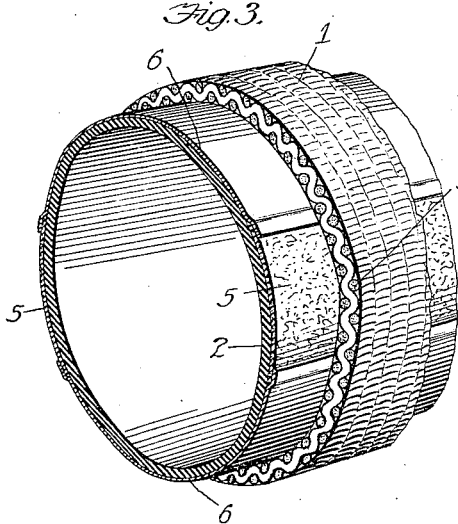
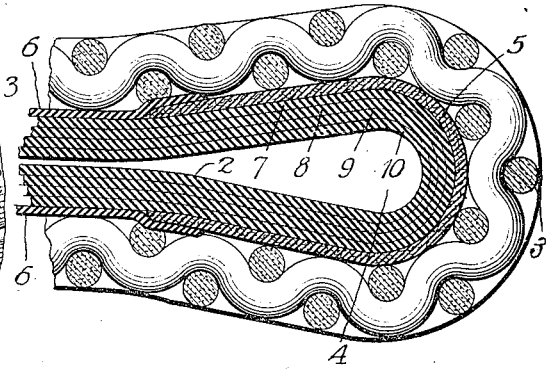
WITNESSES:
Martin H. Olsen.
Fred M. Davis
INVENTOR.
Cassius M. Clay Baird
BY
ATTORNEYS.

Patented May 1, 1923.

1,453,823

UNITED STATES PATENT OFFICE.

CASSIUS M. CLAY BAIRD, OF CHICAGO, ILLINOIS.

HOSE CONSTRUCTION.

Application filed March 24, 1919. Serial No. 284,737.

*To all whom it may concern:*

Be it known that I, CASSIUS M. CLAY BAIRD, a citizen of the United States of America, and a resident of Chicago, county of Cook, and State of Illinois, have invented certain new and useful Improvements in Hose Constructions, of which the following is a specification.

This invention relates to flat-folding hose of the general type represented by my Letters Patent No. 935,086, granted to me under date of September 28, 1909, wherein I pointed out the advantage of leaving the rubber lining uncemented and free from the surrounding fabric or jacket along two diametrically opposite longitudinal folding zones, in order that the lining might readily accommodate itself to the necessary bending without pinching or creasing in any such manner as to cause rupture or weakening when the hose is flattened or when folded.

It has also been proposed that the lining may to advantage be still further protected by means of a reinforcing layer or strip of fabric cut on the bias and cemented to the lining opposite the crease lines of the jacket. Such a strip is intended to prevent a small initial rupture or defect of the lining from running the whole length of hose section. Hose thus constructed, it has been found, serves well for a time, but practice has demonstrated that water gets in between the lining and the jacket and soon rots the reinforcing fabric, which then readily tears and permits the lining to split regardless of the fabric strip as soon as a rupture is once started.

In my Patent No. 1,301,354, dated April 22, 1919, I have described the use of a reinforcing fabric overlaid by a strip of rubber, with a view to excluding moisture from the fabric, but my present form tends to make the reinforcement thinner and more flexible, and simplifies the manufacture.

The main objects of the present invention are to overcome the defects above-mentioned; to provide a reinforcement of simple and improved character such as may be relied upon to last throughout the normal life of the hose; to provide an improved and more flexible form of hose-lining reinforcement having great tenacity and strength and ability to resist water; and to provide a moisture-proof reinforcing strip for the hose-lining having fibers distributed throughout its mass, regardless of any fabricated arrangement.

An illustrative embodiment of the invention is shown in the accompanying drawings, in which—

Fig. 1 is a cross section of the hose when expanded to a somewhat elliptical shape by external pressure against the fold lines on each side.

Fig. 2 is a similar view showing the hose folded flat.

Fig. 3 is a perspective view of a short section of the hose with certain parts broken away to show the structure.

Fig. 4 is an enlarged sectional detail taken substantially on the same line as Fig. 2.

In the embodiment shown in the drawings, the outer casing 1 may be formed in any approved manner, but preferably consists of a woven fabric. Within this casing is a rubber lining or inner tube 2. The hose as a whole is creased on opposite sides as at 3 so as to induce it to bend naturally at such points for folding flat when not in use. The lining 2 is free from the casing adjacent to the creases 3, the remaining parts between the unattached portions being firmly attached as by means of rubber cement, as will be understood.

This construction permits sufficient freedom of movement for the lining opposite the creases so that it may assume a rounded form as indicated at 4 on Fig. 2. In order to protect the lining at these points against breaking or tearing and to stiffen the lining somewhat, a reinforcing layer 5 is attached thereto as by cementing opposite the creases. Said strip 5, in order that it may be yielding and yet sufficiently resistant, is composed of high-grade rubber reinforced by tenacious flexible fibers, such as hair, vegetable fibers, or the like.

For the purpose of cementing the lining and the outer edges of the reinforcing strip 5 to the fabric jacket, a layer 6 of cement material in the form of friction rubber is applied to the exterior of the lining between the reinforcing strips. Then when the lining is drawn into the jacket and vulcanized along the zones extending between the folded portions, the parts are thereby secured together in a unitary manner. The reinforcement 5, being of high-grade rubber, is sufficiently flexible to accommodate the necessary bending, and being strengthened by the fibers distributed throughout its mass, is adapted to prevent any possible small break or tear from running along the length of the hose.

It will be seen by reference to Fig. 4 that when the hose is collapsed, the free part of the lining opposite the reinforcement 5 thickens or upsets somewhat adjacent to the part where the sharpest bend occurs, and at the latter point the lining is relatively thin and evenly bent instead of being cramped and wrinkled as would occur if the lining were cemented to the jacket at this point. The lining 2 is preferably laminated, being formed by vulcanizing a plurality of thin concentric tubes 7, 8, 9, and 10, as understood in the art.

Although but one specific embodiment of this invention has been herein shown and described, it will be understood that numerous details of the construction shown may be altered or omitted without departing from the spirit of this invention as defined by the following claims.

I claim:

1. In a device of the character described, a rubber tube having secured thereto on opposite sides a pair of reinforcing strips of rubber containing non-woven fibers adapted to prevent tearing, said tube being formed with a longitudinal fold-set adapted to assure folding of the tube along the central axes of said strips when collapsed.

2. A flat-folding hose comprising a jacket and a rubber lining secured thereto along zones extending between the fold lines, said lining at and adjacent to the fold lines being free from the jacket, and said lining being reinforced along the fold lines, the reinforcing means including unwoven distributed fibrous material embedded in a unitary protective mass of rubber.

3. A hose comprising a fabric jacket, in combination with a tubular rubber lining having a pair of reinforcing strips of high-grade rubber vulcanized thereto on diametrically opposite sides, each of said strips having flexible unwoven tenacious fibers distributed throughout its mass, and the hose walls being formed with a fold-set adapted to cause flat folding of the hose along said strips when empty, said jacket and lining being secured together on opposite sides between said strips, and the jacket being free from the lining opposite said strips.

Signed at Chicago this 22 day of March 1919.

CASSIUS M. CLAY BAIRD.